3,225,101
PROCESS FOR PURIFYING HYDRAZINIUM CHLORIDES
George L. Braude, North Linthicum, and Joseph A. Cogliano, Baltimore, Md., assignors to W. R. Grace & Co., a corporation of Connecticut
No Drawing. Filed Dec. 26, 1962, Ser. No. 247,280
2 Claims. (Cl. 260—583)

This invention relates to a process for preparing pure hydrazinium compounds. In one specific aspect, it relates to the preparation of pure hydrazinium chlorides.

There are several methods for preparing hydrazinium chlorides known in the art. Generally, the most satisfactory of these is the chloramination of tertiary amines. Our invention is particularly concerned with hydrazinium chlorides prepared by this reaction.

The chloramination reaction is represented by the following equation:

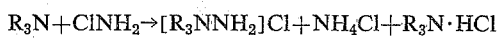

$$R_3N + ClNH_2 \rightarrow [R_3NNH_2]Cl + NH_4Cl + R_3N \cdot HCl$$

The major product of the reaction is the desired hydrazinium chloride. However, ammonium chloride and amine hydrochloride are also produced and contaminate the valuable product.

The reaction is generally carried out in an unreactive organic solvent in which ammonium chloride is essentially insoluble and in which the hydrazinium chloride is soluble. Thus, the major portion of this contaminant can be removed by filtration. However, the small percent of ammonium chloride which is soluble and the amine hydrochloride which is also soluble cannot be removed in this manner.

For many uses, the low percentage of soluble impurities can be tolerated. However, certain uses (e.g. pharmaceutical) demand an absolutely pure product. In the past, it has been virtually impossible to prepare pure hydrazinium chlorides produced by the chloramination reaction economically. We have now found a method by which this is easily accomplished.

Our invention consists of purifying the hydrazinium chlorides by ion exchange. Briefly, the process consists of preparing the hydrazinium chloride by the reaction of gaseous chloramine and tertiary amine, filtering the reaction mixture to remove precipitated ammonium chloride, passing the filtrate through an anion exchange column in the hydroxyl form, evaporating the effluent and finally, reconverting the hydrazinium hydroxide to the chloride salt.

The chloramination reaction is carried out according to the teachings of Sisler et al., contained in U.S. Patent No. 2,710,248, and Omietanski, U.S. Patent No. 2,955,-108.

Briefly, the process consists of dissolving a selected tertiary amine in an unreactive organic solvent, subjecting this to the action of a gaseous chloramine-ammonia mixture until chloramination of the amine is complete and finally recovering the reaction mixture. This mixture contains soluble hydrazinium chloride, soluble amine hydrochloride, insoluble ammonium chloride and generally about 1% soluble ammonium chloride.

It is obvious that the ion exchange resin must be carefully selected. The resin used in our process is a strongly basic anion exchange resin which is especially prepared for use with non-aqueous solvents.

The particular type used in the examples of this invention is a polystyrene divinyl benzene copolymer, quaternary ammonium type possessing a high degree of porosity and a rigid structure which allows only minimum volume changes in non-aqueous solvents. Its exchange capacity is 2.7 meq./gm. (weight) and 1.0 meq./ml. (volume).

However, any type of anion exchanger which can be used with non-aqueous solvents and can be converted to the hydroxyl form is suitable.

The reaction solvent containing dissolved hydrazinium chloride, amine hydrochloride and ammonium chloride is passed through the resin. The hydrazinium chloride and ammonium chloride are converted to the hydroxides and the amine hydrochloride is converted to the free amine. Since the amine and ammonium hydroxide are volatile, they evaporate along with the solvent and leave the pure hydrazinium hydroxide as product. Any suitable means can be used for the evaporation such as vacuum, air, low heat, etc. The method chosen may be determined by the stability of the hydrazinium hydroxide.

The general scheme of the purification process can be illustrated as follows:

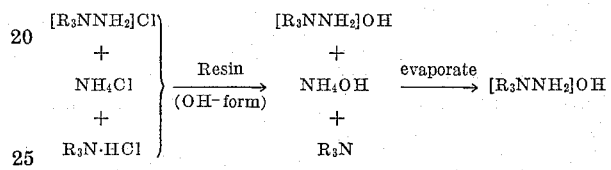

At this point in the process, the pure hydrazinium hydroxide is obtained. This can readily be converted to the chloride salt by any suitable means such as treatment with hydrochloric acid.

The preferred means of conversion of our invention, however, consists of redissolving the hydrazinium hydroxide in a suitable non-aqueous solvent and passing this through a second anion exchange column in the chloride form. The exhaustion rate of the hydroxyl and chloride columns is about the same so that they can be interchanged instead of regenerated separately. This amounts to savings in time and costs.

Our method provides an added advantage in the chloramination process. Since it can conveniently be included as the last step of the process, it is no longer necessary to first recover the hydrazinium chloride from the reaction solvent and then proceed to purify it. Obviously, our technique is equally applicable if it is preferred to recover the impure hydrazinium chloride and proceed with the purification at a later date.

Our method can also be used for preparing hydrazinium salts other than chloride. If the hydroxide is desired, the reconversion to the chloride need not be carried out. Other salts, such as the nitrate, sulfate, acetate, etc., can be prepared by passing a solution of the pure hydrazinium hydroxide through an anion exchange column in the selected anionic form. The same type of column used for the chloride exchange is effective here.

If a very pure salt is not desired, the exchange to the nitrate for example, can be made directly from the hydrazinium chloride without going through the purification step. In this case, the reaction solvent containing the unpurified hydrazinium chloride is passed through the ion exchange column in the selected anionic form.

This method is especially useful for preparing hydrazinium salts in which the cation, anion or both are water insoluble or water sensitive. A number of techniques (e.g. action of moist silver oxide, etc.) are available for preparing salts when water can be used as the solvent. However, it has been very difficult in the past to prepare hydrazinium salts in which one or both of the fragments are water insoluble or water sensitive. Examples of this type include methyl-dihexadecyl hydrazinium stearate, trioctadecyl hydrazinium chloride, triethyl hydrazinium naphthenate, N-dodecyl-N-amine-morpholinium stearate, N-N-dimethyl-N-hexadecyl-hydrazinium dodecyl sulfate, and trimethyl hydrazinium chlorosulfonate.

Our invention will be further explained by the following specific but non-limiting examples.

*Example I*

In this run, triethyl hydrazinium chloride, prepared by the chloramination of triethyl amine, was purified.

A 5% solution of triethyl hydrazinium chloride in 2-propanol was prepared. The undissolved ammonium chloride was filtered off using suction filtration.

One hundred grams of Amberlyst XN–1002, in the chloride form (available from Rohm & Haas Company, Philadelphia, Pa.) a strongly basic anion exchange resin, was placed in an ion exchange tube and washed with deionized water, then with a 10% aqueous NaOH solution and again with deionized water to a neutral pH. Following the third rinse, the resin was rinsed well with methanol and 2-propanol.

The triethyl hydrazinium chloride solution was passed slowly over the column. The effluent from the column was recovered and concentrated under vacuum to yield pure triethyl hydrazinium hydroxide as a white deliquescent salt.

The effluent was analyzed periodically for chloride ion by argentometry during and after the run. No trace of Cl$^-$ could be found in the solution or in the dried triethyl hydrazinium hydroxide, showing quantitative conversion.

A 5 gram sample of triethyl hydrazinium hydroxide was treated with a stoichiometric amount of 0.1 N hydrogen chloride in 2-propanol. The resulting solution was cooled and the hydrazinium chloride recovered by precipitating with an excess of diethyl ether followed by filtration and vacuum drying for 2 hours at 80° C.

*Example II*

This run includes our purification procedure as the last step of a chloramination process.

29.6 grams (0.5 mole) of trimethylamine were dissolved in 1 liter of 2-propanol and treated with a stream of chloramine in accordance with the teaching of Sisler (U.S. Patent No. 2,710,248). The reaction mixture containing trimethyl hydrazinium chloride, trimethylamine, trimethylamine hydrochloride and ammonium chloride was heated to near boiling and filtered. Ammonium chloride (except approximately 1%) was removed as a cake.

The filtrate contained all of the hydrazinium chloride and less than 5% amine hydrochloride and ammonium chloride as impurities (based on solids present). Five percent (50 ml.) of this solution was then passed over a bed of Amberlyst XN1002 resin. This resin had been pretreated with an excess of a 2% solution of NaOH in 2-propanol and then with pure 2-propanol until the effluent was neutral.

The effluent, containing hydrazinium hydroxide, trimethylamine and ammonium hydroxide was then added to the main filtrate from the ammonium chloride filtration step making the mixed solution strongly basic. The solution was then concentrated under vacuum to two-thirds of its initial volume, thus removing the volatile trimethylamine and ammonia.

The concentrated solution was then passed over an Amberlyst XN 1002 resin in its chloride form, and the effluent of this operation concentrated and cooled. Pure trimethyl hydrazinium chloride, which was free of amine, amine hydrochloride or ammonium chloride, was obtained in near quantitative yield.

*Example III*

This example demonstrates a technique for carrying out the ionic conversion without passing the reactant solutions through an exchange column.

A solution of crude trimethyl hydrazinium chloride was first obtained by removal of ammonium chloride, as in Example II. To this filtrate, 20 g. of Amberlyst XN 1002 (pretreated with NaOH as in Example II) were added directly, and the solution stirred for 1 hour. The resin was then removed by filtration. The alkaline solution was concentrated and treated further as described in Example II, to yield pure trimethyl hydrazinium chloride.

*Example IV*

This example illustrates the ease of preparation of hydrazinium salts other than chloride by the method of our invention.

In this run, triethyl hydrazinium nitrate was prepared.

One hundred grams of Amberlyst XN 1002 resin were placed in an ion exchange column, washed well with deionized water and then with a 5% aqueous sodium nitrate solution. The column was then rinsed with deionized water, methanol and 2-propanol.

Two grams of triethyl hydrazinium chloride were dissolved in 38 grams of 2-propanol and the solution passed over the column. The effluent from the column was evaporated under vacuum and yielded white crystalline triethyl hydrazinium nitrate, which was entirely free of chloride (argentometric determination).

*Example V*

This run illustrates the ease of preparation of a hydrazinium salt containing a water insoluble cationic fragment.

110 grams of Amberlyst XN 1002 were washed in an ion exchange tube with deionized water and then treated with a 5% aqueous sodium benzoate solution. The resin was washed free of excess salt with water, methanol and finally, chloroform.

A 2% solution of dimethyl hexadecyl hydrazinium chloride in chloroform was then prepared and passed slowly through the ion exchange bed. The effluent was tested for chloride ions with the standard silver nitrate test and was found to contain no ionic chloride. Evaporation of the chloroform gave pure white crystalline hexadecyl dimethyl hydrazinium benzoate. The product melted at 69.7 to 71.3° C.

*Example VI*

In this run, a hydrazinium laurate was prepared. 110 gms. of Amberlyst XN 1002 resin were rinsed in an ion exchange tube with deionized water and then treated with a 10% aqueous solution of NaOH, then washed with deionized water to a neutral pH. Following the second water rinse, the resin was washed with methanol and 2-propanol.

5.2 g. (0.01 mole) of methyl dihexadecyl amine in 100 mls. of 2-propanol were treated with an excess of chloramine (0.03 mole). The resulting slurry was filtered to remove the ammonium chloride. The filtrate containing methyl dihexadecyl hydrazinium chloride, 1% ammonium chloride and smaller quantities of amine and amine hydrochloride was then passed over the resin. The effluent was concentrated to 50% of its initial volume under vacuum. Volatile ammonia was removed by this method. A solution of lauric acid in 2-propanol (5%) was then added slowly to pH 7. On concentration and cooling, methyl dihexadecyl hydrazinium laurate was obtained.

We claim:

1. A method for purifying water insoluble hydrazinium chlorides containing ammonium chloride as an impurity which comprises dissolving the mixture in a non-aqueous solvent selected from the group consisting of 2-propanol and chloroform, filtering the mixture to remove undissolved ammonium chloride, passing the mixture through an anion exchange resin of polystyrene divinyl benzene copolymer quaternary ammonium in the hydroxyl form, collecting the effluent and evaporating the volatile components contained therein converting the hydrazinium hydroxide remaining after evaporation to the chloride salt, and finally recovering the pure hydrazinium chloride.

2. A method for purifying a hydrazinium chloride selected from the group consisting of triethyl hydrazinium chloride, trimethyl hydrazinium chloride, dimethyl hexadecyl hydrazinium chloride and methyl dihexadecyl hydrazinium chloride containing ammonium chloride as an impurity which comprises dissolving the mixture in a non-aqueous solvent selected from the group consisting of 2-propanol and chloroform, separating undissolved ammonium chloride from the solution, passing the solution through an anion exchanger of polystyrene-divinyl benzene copolymer quaternary ammonium in the hydroxyl form, collecting the effluent, evaporating volatile components contained therein, converting the hydrazinium hydroxide remaining after evaporation to the chloride salt and finally recovering the pure hydrazinium chloride.

References Cited by the Examiner

UNITED STATES PATENTS 2,710,248  6/1955  Sisler et al. _____ 260—583 X
2,955,108  10/1960  Omietanski _____ 260—583 X

FOREIGN PATENTS 853,799  11/1960  Great Britain.

OTHER REFERENCES

Ion Exchange, Rohm & Haas Co., Philadelphia 5, Pa. (November 1960, pp. 2 and 9).

Kunin: Ion Exchange Resins, Second Edition, J. Wiley & Sons, New York (1958) (pp. 106–108).

CHARLES B. PARKER, *Primary Examiner.*